(12) United States Patent
Bell et al.

(10) Patent No.: US 10,019,726 B2
(45) Date of Patent: Jul. 10, 2018

(54) SUPPLEMENTAL ANALYSIS MODULE FOR INVITATIONAL CONTENT

(71) Applicant: Apple Inc., Cupertino, CA (US)

(72) Inventors: James L. Bell, San Francisco, CA (US); Michael Froimowitz Greenzeiger, Sunnyvale, CA (US); Ryan S. Mehlmauer, San Jose, CA (US); Daniel Bates, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 1086 days.

(21) Appl. No.: 14/156,319

(22) Filed: Jan. 15, 2014

(65) Prior Publication Data
US 2015/0199710 A1 Jul. 16, 2015

(51) Int. Cl.
G06Q 30/02 (2012.01)

(52) U.S. Cl.
CPC ..... *G06Q 30/0242* (2013.01); *G06Q 30/0246* (2013.01); *G06Q 30/0251* (2013.01); *G06Q 30/0252* (2013.01); *G06Q 30/0267* (2013.01); *G06Q 30/0277* (2013.01)

(58) Field of Classification Search
CPC ............... G06Q 30/02; G06Q 30/0241; G06Q 30/0242; G06Q 30/0251; G06Q 30/0277; G06Q 30/0246; H04L 67/20; H04L 67/26
See application file for complete search history.

(56) References Cited

U.S. PATENT DOCUMENTS

| 7,222,165 | B1 | 5/2007 | Ellis et al. | |
| 7,310,609 | B2* | 12/2007 | Middleton, III | G06Q 30/02 705/14.41 |
| 8,903,927 | B2* | 12/2014 | Chen | G06Q 50/01 705/14.53 |
| 2007/0027753 | A1* | 2/2007 | Collins | G06Q 30/0242 705/14.54 |
| 2007/0179842 | A1* | 8/2007 | Chen | G06Q 30/02 705/14.14 |
| 2007/0244750 | A1* | 10/2007 | Grannan | G06Q 30/0267 705/14.64 |
| 2008/0114639 | A1* | 5/2008 | Meek | G06Q 30/02 705/14.41 |
| 2008/0168099 | A1* | 7/2008 | Skaf | G06Q 30/02 |
| 2008/0282290 | A1* | 11/2008 | Malik | G06Q 30/0251 725/42 |
| 2009/0006188 | A1* | 1/2009 | Guo | G06Q 30/02 705/14.27 |
| 2009/0157511 | A1* | 6/2009 | Spinnell | G06Q 30/02 705/14.1 |

(Continued)

Primary Examiner — Ramy M Osman
(74) Attorney, Agent, or Firm — Polsinelli LLP

(57) ABSTRACT

Method and arrangements are provided to generate supplemental analysis modules for items of invitational content, the modules including an event dictionary and event handlers. Such modules are configured to collect event information at an end user device associated with the operation of an item of invitational content, determine whether the event information corresponds to an entry in the event dictionary, and, upon determining that the event information corresponds to an entry, identify an event handler corresponding to the entry and routing the event information to the event handler, where the event handler is configured for generating an event message.

22 Claims, 6 Drawing Sheets

(56) References Cited

U.S. PATENT DOCUMENTS

| | | | |
|---|---|---|---|
| 2009/0197582 A1* | 8/2009 | Lewis | H04W 4/02 455/414.2 |
| 2009/0259552 A1* | 10/2009 | Chenard | G06Q 30/02 705/14.72 |
| 2010/0241510 A1* | 9/2010 | Zhang | G06Q 30/0246 705/14.45 |
| 2011/0218858 A1* | 9/2011 | Christensen | G06Q 30/0253 705/14.51 |
| 2011/0258039 A1* | 10/2011 | Patwa | G06Q 30/0242 705/14.45 |
| 2013/0179534 A1 | 7/2013 | Sanghavi et al. | |
| 2013/0226689 A1* | 8/2013 | Nemitz | G06Q 30/0277 705/14.41 |
| 2013/0254683 A1 | 9/2013 | Leibu et al. | |
| 2014/0074592 A1* | 3/2014 | van Elsas | G06Q 30/0246 705/14.45 |
| 2014/0351041 A1* | 11/2014 | Brown | G06Q 30/0246 705/14.45 |
| 2015/0178776 A1* | 6/2015 | Li | G06Q 30/0241 705/14.55 |

\* cited by examiner

100

300

500

SUPPLEMENTAL ANALYSIS MODULE FOR INVITATIONAL CONTENT

TECHNICAL FIELD

The present technology pertains to reporting of user engagement with invitational content, and more specifically pertains to utilization of a supplemental analysis module to improve reporting user engagement.

BACKGROUND

Mobile advertising is widely used by advertisers to market their products via mobile devices. Given the widespread availability of mobile devices, mobile advertising can be an extremely effective way for advertisers to reach a wide mass of potential customers and induce numerous users to purchase their products. By targeting mobile users with effective mobile advertisements, advertisers can yield large financial returns from their mobile advertisements. Not surprisingly, many advertisers continuously measure the performance of their advertisements to understand how, if necessary, they can optimize their advertisements for a better performance.

One difficulty in evaluating the performance of mobile advertising is the collection of data regarding user engagement. In general, the reporting of data regarding user engagement currently requires a significant amount of human resources. For example, the architecture for many existing mobile advertising units requires that the units be hard-coded by the developer of the mobile advertising unit to identify events of interest for the mobile advertising unit and to generate messages for the developer to evaluate the mobile advertising unit. However, the identification or tagging of specific events is typically not standardized. That is, different developers may be interested in different aspect of user interaction.

One result of the foregoing process is that analysis of the performance of a particular mobile advertisement unit becomes inaccurate. In particular, since events in such units are not standardized, this typically requires that a human operator review the results available for a unit and infer conclusions solely from this available data. This introduces a subjective element into the process and thus the analysis may result in conclusions that are inaccurate, incomplete, or completely wrong. Another result of this process is that since different mobile advertising units will generate differing sets of data regarding user engagement, it is difficult to make head-to-head comparisons between different mobile advertisements. This problem is also exacerbated by human intervention. In particular, the selection of events to compare or analyze for comparison is subjective. Accordingly, the process again may again result in conclusions that are inaccurate, incomplete, or completely wrong.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to provide supplemental analysis modules to be included within invitational content to allow the reporting of user engagement events beyond those hard-coded into existing items of invitational content. In particular, such modules are designed to be incorporated into items of invitational content, irrespective of the other content of the items, and to operate without interfering with the normal operations of the items. Disclosed are devices, systems, methods, and non-transitory computer-readable storage media for creating, inserting, and processing such analysis modules.

One aspect of the present technology involves providing items of invitational content with such analysis modules to end user devices. This can include selecting an item for an end user device, modifying the item to include the analysis module, and delivering the modified item to the end user device. This also involves assembling an analysis module for the item to include an analysis engine, an event dictionary, and at least one event handler associated with each entry of the event dictionary. The analysis engine is configured for causing the end user device, responsive to operation of the modified item at the end user device, to collect event information generated at the end user device and determine whether the event information corresponds to at least one entry in the event dictionary. In the event of such correspondence the event information can be routed to the event handler associated with the entry.

The entries in the event dictionary can correspond to events such as a page view at the end user device, a trackable view type generated at the end user device, a gesture detected at the end user device, a media item event at the end user device, or a system-level event at the end user device. The event handler can be configured to insert a plurality of parameters in an event message, such as an event name, an event section, an event sender, event arguments, and an event type.

In the event that event messages associated with the modified item are received from the end user device, this aspect of the present technology also involves determining whether the received event data corresponds to the analysis module associated with the modified item and forwarding messages to an appropriate log.

Another aspect of the present technology involves the processing of analysis modules at end user devices. This can include receiving items of invitational content including such analysis modules. In response to the operation of the item, event information generated at the end user device can be collected and can be routed to an appropriate event handler, provided the event at the end user device corresponds to an entry in the event dictionary. The event handler can then form an event message that can be logged. The present disclosure contemplates that such messaging can be configured to not interfere with any messaging hard-coded into the item.

Another aspect of the present technology involves a process for registering event handlers. This can involve receiving an event handler request specifying the event handler and the event corresponding to the event handler. The event handler can then be registered, in which the event handler is stored for future use and an entry in the event dictionary specifying which events to route to the event handler is provided. The new event handler and the updated dictionary can then be published so that they can be used for future requests for items of invitational content.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustrative purposes only. A person skilled in the relevant art will recognize that other components and configurations may be used without parting from the spirit and scope of the disclosure.

The disclosed technology addresses the need in the art for accurate and efficient means of collecting data that can be used to analyze or evaluate user engagement with respect to invitational content. In particular, the present technology is directed to systems, methods, and non-transitory computer-readable storage media providing improved reporting of user engagement.

As discussed above, an issue with the collecting of data regarding user engagement is the requirement that facilities for reporting of data regarding user engagement be hard-coded into the invitational content itself and that such hard-coding is non-standardized. This makes analysis user engagement data and revision of the facilities for generating such data difficult and time-consuming. In view of the limitations of existing methods, the present technology is directed to a methodology that does not require such hard-coding. Rather, the present technology instead relies on insertion of a supplemental analysis module into invitational content being delivered, which can provide standardized reporting of events associated with user engagement or other activities. This can be used, separately or in conjunction with hard-coded event reporting, to provide data and analyses of such data that remove some or all of the subjectivity typically required for collecting and analyzing data.

Prior to discussing the present technology in detail, a brief introductory description of an exemplary configuration of devices and a network is disclosed herein. A detailed description of the various aspects of the present technology will then follow. These variations shall be described herein as the various embodiments are set forth. The disclosure now turns to FIG. 1.

Figure 1:
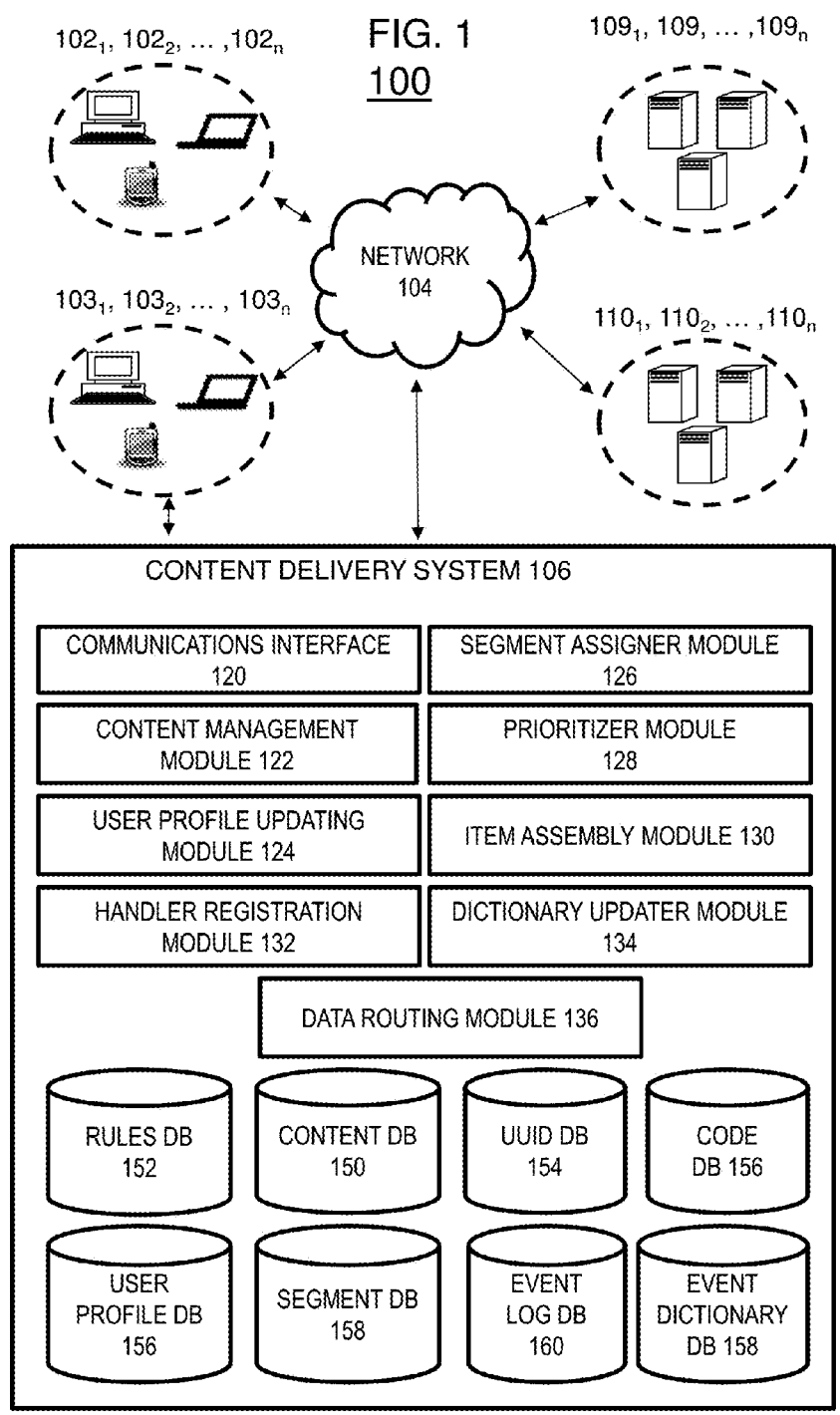
FIG. 1 illustrates an exemplary configuration of devices and a network.

An exemplary system configuration 100 is illustrated in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, invitational content can be delivered to user terminals $102_1, 102_2, \ldots, 102_n$ (collectively "102") connected to a network 104 by direct and/or indirect communications with a content delivery system 106. User terminals 102 can be any network enabled client devices, such as desktop computers; mobile computers; handheld communications devices, e.g. mobile phones, smart phones, tablets; smart televisions; set-top boxes; and/or any other network enabled computing devices. Furthermore, content delivery system 106 can concurrently accept connections from and interact with multiple user terminals 102.

The content delivery system 106 can receive a request for electronic content, such as a web page, an application, a media item, etc., from one of user terminals 102. Thereafter, the content delivery system 106 can assemble a content package and transmit the assembled content page to the requesting one of user terminals 102. To facilitate communications with the user terminals 102 and/or any other device or component, the content delivery system 106 can include a communications interface 120.

The content delivery system 106 can include a content management module 122 to facilitate the generation of an assembled content package. Specifically, the content management module 122 can combine content from one or more primary content providers $109_1, 109_2, \ldots, 109_n$ (collectively "109") and content from one or more secondary content providers $110_1, 110_2, \ldots, 110_n$ (collectively "110") to generate the assembled content package for the user terminals 102. For example, in the case of a web page being delivered to a requesting one of user terminals 102, the content management module 122 can assemble a content package by requesting the data for the web page from one of the primary content providers 109 maintaining the web page. For the invitational content on the web page provided by the secondary content providers 110, the content management module 122 can request the appropriate data according to the arrangement between the primary and secondary content providers 109 and 110. Additionally, the content management module 122 can create content packages that contain content from a single content provider. That is, a content package can contain only primary content or a content package can contain only secondary content. However, the content package is not limited to the content from content providers 109 and 110. Rather, the content package can include other data generated at the content delivery system 106. In some embodiments, the content delivery system 106 can preselect the content package before a request is received.

An assembled content package can include text, graphics, audio, video, executable code, or any combination thereof. Further, an assembled content package can include invitational content designed to inform or elicit a pre-defined response from the user. In some embodiments, the invitational content can be associated with a product or can directly or indirectly advertise a product. For example, the assembled content package can include one or more types of advertisements from one or more advertisers.

Additionally, the invitational content can be active invitational content. That is, invitational content that is designed to primarily elicit a pre-defined response from a user. For example, active invitational content can include one or more types of advertisements configured to be clicked upon, solicit information, or be converted by the user into a further action, such as a purchase or a download of the advertised item. However, invitational content can also be passive invitational content. That is invitational content that is designed to primarily inform the user, such as a video. In some cases, passive invitational content can include information that can lead or direct users to other invitational content including active invitational content.

Furthermore, the invitational content can be dynamic invitational content. That is invitational content that varies over time or that varies based on user interaction. For example, dynamic invitational content can include an interactive game. However, the various embodiments are not limited in this regard and the invitational content can include static invitational content that neither varies over time nor with user interaction. In the various embodiments, invitational content in a content package can be static or dynamic and active or passive. A content package can include a combination of various types of invitational content in a single content package.

In some cases, a content package can replace or update invitational content in a content package already delivered to a user terminal. For example, a first content package can include an app that can be installed on the user terminal $102_i$. A subsequent content package can include one or more items of invitational content that can be presented to a user of the user terminal $102_i$ while the user interacts with the app.

Although primary and secondary providers 109 and 110 are presented herein as separate entities, this is for illustrative purposes only. In some cases, the primary and the secondary content providers 109 and 110 can be the same entity. Thus, a single entity can provide both the primary and the secondary content.

The content management module 122 can be configured to request that content be sent directly from content providers 109 and 110. Alternatively, a cached arrangement can also be used to improve performance of the content delivery system 106 and improve overall user experience. That is, the content delivery system 106 can include a content database 150 for locally storing/caching content maintained by content providers 109 and 110. The data in the content database 150 can be refreshed or updated on a regular basis to ensure that the content in the database 150 is up to date at the time of a request from a user terminal $102_i$. However, in some cases, the content management module 122 can be configured to retrieve content directly from content providers 109 and 110 if the metadata associated with the data in the content database 150 appears to be outdated or corrupted.

As described above, content maintained by the content providers 109 and 110 can be combined according to a predefined arrangement between the two content providers, which can be embodied as a set of rules. In an arrangement where the content delivery system 106 assembles the content package from multiple content providers, the assembly rules can be stored in a rules database 152 in the content delivery system 106. The content management module 122 can be configured to assemble the content package for user terminals 102 based on these rules. The rules can specify how to select content from secondary content providers 110 and primary content providers 109 in response to a request from one of user terminals 102. For example, in the case of a web page maintained by one of primary content providers 109 and including invitational content, the rules database 152 can specify rules for selecting one of the secondary providers 110. The rules can also specify how to select specific content from the selected one of secondary providers 110 to be combined with the content provided by one of primary providers 109. In some cases, an item of primary content, such as an app or other media object, can have one or more associated attributes. For example, an app can have one or more associated genre attributes, e.g. travel, sports, education, etc. A rule can be based at least in part on the primary content attributes. Once assembled, the assembled content package can be sent to a requesting one of user terminals 102.

Additionally, rules for combining primary and secondary content can be based on user characteristics known about the user. In particular, in some cases, invitational content can be selected based on the characteristics of the requesting user (s). As used herein, the term "user characteristics" refers to the characteristics of a particular user associated with one or more of user terminals 102. User characteristics can include channel characteristics, demographic characteristics, behavioral characteristics, and spatial-temporal characteristics. Channel characteristics can define the specific delivery channel being used to deliver a content package to a user. For example, channel characteristics can include a type of electronic content, a type of device or user terminal, a carrier or network provider, or any other characteristic that defines a specific delivery channel for the content package. Spatial-temporal characteristics can define a location, a location zone, a date, a time, or any other characteristic that defines a geographic location and/or a time for delivery of the content package. Demographic characteristics can define characteristics of the users targeted by the content or associated with the content. For example, demographic characteristics can include age, income, ethnicity, gender, occupation, or any other user characteristics. Behavioral characteristics can define user behaviors for one or more different types of content, separately or in combination with any other user characteristics. That is, different behavioral characteristics may be associated with different channel, demographic, or spatial-temporal characteristics. User characteristics can also include characteristics descriptive of a user's state of mind including characteristics indicative of how likely a user is to click on or convert an item of invitational content if it were displayed to the user. User characteristics can be learned directly or derived indirectly from a variety of sources. In some embodiments, the user characteristic values can be collected from one or more databases. For example, if the user is registered with an online media service, such as the ITUNES store maintained by Apple Inc. of Cupertino, Calif., the collected data could include the user's registration information. Such data can provide values for declared user characteristics. Furthermore, the content delivery system 106 can be configured to learn of or derive user characteristics from any number of other information sources. For example, in some configurations, the content delivery system 106 can derive or infer one or more user characteristic values from user characteristic values already known about the user.

In some embodiments, the interactive content can be associated with one or more targeted segments. A targeted segment can be viewed as defining a space or region in k-dimensional space, where each of the k dimensions is associated with one of a plurality of user characteristics. In the various embodiments, the k dimensions can include both orthogonal and non-orthogonal dimensions. That is, some of the k dimensions can overlap or can be related in some aspect.

In the various embodiments, the content delivery system 106 can also include a unique user identifier (UUID) database 154 that can be used for managing sessions with the various user terminal devices 102. The UUID database 154 can be used with a variety of session management techniques. For example, the content delivery system 106 can implement an HTTP cookie or any other conventional session management method (e.g., IP address tracking, URL query strings, hidden form fields, window name tracking, authentication methods, and local shared objects) for user terminals 102 connected to content delivery system 106 via a substantially persistent network session. However, other methods can be used as well. For example, in the case of handheld communications devices, e.g. mobile phones, smart phones, tablets, or other types of user terminals connecting using multiple or non-persistent network sessions, multiple requests for content from such devices may be assigned to a same entry in the UUID database 154. The content delivery system 106 can analyze the attributes of requesting devices to determine whether such requests can be attributed to the same device. Such attributes can include device or group-specific attributes.

In some embodiments, the content delivery system 106 can include a user-profile database 156. The user-profile database 156 can, at least in part, be constructed based on declared user characteristics related to one or more users. In some cases, the user-profile database may contain inferred or derived user characteristic values. The user-profile database 156 can be updated using a user-profile-updater module 124. In some embodiments, the user-profile-updater module 124 can be configured to add additional profile data, update profile data, fill in missing profile data, or infer user characteristic values from declared data.

The user-profile-updater module 124 can also be configured to maintain the user profile database 156 to include only more recently acquired data or to re-derive any inferred characteristics in order to ensure that the user profile is an accurate reflection of the current state of the user (location, state of mind, behaviors, demographics, etc. can change rapidly). For example, the user-profile-updater module 124 can be configured to maintain the user profile database 156 to include only data from the last two to three months. However, the user-profile-updater module 124 can be configured to adjust the data in the user profile database 156 to cover any span of time. In some instances the user-profile-updater module 124 can update the profile database 156 in real-time. Alternatively, the user-profile-updater module 124 can be configured to set an expiration period on a subset of the data in the user profile database 156. For example, a policy can specify that user declared data is maintained as long as the user account is active, but user characteristic values based on location information expire after a specified period of time. In some cases, a user can set the expiration period. In some instances, the user-profile-updater module 124 can update the user profile database 156 at least every week, or every day. In some cases, the content delivery system 106 can receive a direct request to update one or more user profiles. The update request can come directly from the user's device or any other device capable of communicating with the content delivery system 106, such as other content delivery networks or websites. In some cases, the content delivery system 106 can receive an indirect request to update one or more user profiles. An indirect request can be the result of receiving new user characteristic values. An update request can occur at any time.

In some embodiments, the content delivery system 106 can include a segment database 158 that is used to aid in selecting invitational content to target to users. The segment database 158 can store defined segments and associations between the segments and users and/or invitational content that should be targeted to users associated with the segments. As described above, a targeted segment can be defined based on one or more user characteristics or derivatives thereof and can be associated with one or more items of invitational content. Additionally, a targeted segment can be associated with one or more users. In some embodiments, by associating a targeted segment with both a user and an item of invitational content, the delivery system can match invitational content with users. In some embodiments, the content delivery system 106 can update the segment database 158 to add newly defined targeted segments or to delete targeted segments.

In some cases a targeted segment can be as simple as a single user characteristic identifier and a single user characteristic value. For example, the common demographic identifiers of gender, age, occupation, or income can each be used in defining corresponding targeted segments. A characteristic value can also be assigned to the identifier. For example, the values of male, 19, and student can be assigned to the user characteristics of gender, age, and occupation, respectively. However, more complex targeted segments can also be defined that consist of one or more identifiers with one or more values associated with each identifier. For example, a targeted segment can be defined to target a user with the following characteristics: gender, male; age, 19-24; location, Northern California or New York City. Additional exemplary segments are described throughout this disclosure. Furthermore, targeted segments can correspond to one or more segments that content providers are likely to easily understand and thus can quickly identify as being relevant to their content. Additionally, in some embodiments, content providers 109 and 110 can define a custom targeted segment.

In some embodiments, the content delivery system 106 can provide a segment assigner module 126. The segment assigner module 126 can apply a set of user characteristics associated with a user (including segments to which a user has been previously assigned) to assign the user to one or more targeted segments. The assigner module 126 can obtain the set of user characteristic values from the user profile database 154 and/or from the user's activities during the current session. The segment assigner module 126 can assign a user to one or more defined targeted segments in the segment database 158, or alternatively, a user can be assigned to a custom targeted segment defined to meet specific goals of a content provider.

Based on the assigned segments, the user profile database 156 can be updated to reflect the segment assignments. Additionally, the content delivery system 106 can use the segment assignments to select targeted content. In some cases, the user profile data in the user profile database 156 can change over time so the segment assigner module 126 can be configured to periodically update the segment assignments in the user profile database 156. The segment assignment update can be triggered at specified intervals, upon detection of a change in the user profile database 156, and/or upon detection of a specified activity in the content delivery system 106.

In some embodiments, the content delivery system 106 can provide a prioritizer module 128. The prioritizer module 128 can perform a variety of prioritizing tasks based on the configuration of the content delivery system 106. In some configurations, the prioritizer module 128 can prioritize the targeted segments assigned to a user. The prioritization can be influenced by a number of factors, which can include the user's context, a content provider's campaign goals, and/or the content that is currently available for display to the user. A request to prioritize the targeted segments can be explicit or implicit and can be made by any component of the system 100. For example, a secondary content provider 110 can explicitly request that the content delivery system 106 prioritize the targeted segments or the request can be implicit as part of a request for a content package. The resulting prioritized list can be provided, for example, to the content management module 122, which can then use the information to assemble and deliver a content package. Additionally, the prioritized list can be stored, for example in the user profile, for later use.

While the content delivery system 106 is presented with specific components, it should be understood by one skilled in the art, that the architectural configuration of system 106 is simply one possible configuration and that other configurations with more or less components are also possible.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

To implement the various embodiments of the present technology, the content delivery system 106 can include additional components. As noted above, one aspect of the present technology is to insert or supplement an existing item of invitational content with a standardized analysis module. To this end, the content management system 106 can further include an item assembly module 130. The item assembly module 130 can be configured to operate after selection of an invitational content item discussed above.

In particular, the item assembly module 130 is configured to supplement existing reporting capabilities associated with an invitational content item. For example, in some cases an item of invitational content delivered to one or user devices 102 can include a JavaScript-based engine or module that is designed to listen or monitor for events at the device and thereafter cause messages to be transmitted back to the content management system 106. This engine or module is typically hard-coded in the item and thus cannot be changed on-the-fly. The present technology contemplates supplementing this module with an analysis module that can be updated over time. Thus no updating of the invitational content item is required. Further, the present disclosure contemplates a standard reporting from such a module. Thus, the module can be added to any item of invitational content, regardless of its features.

In operation, the item assembly module 130 can intercept or otherwise obtain the item of invitational content prior to delivery to the end user at one of devices 102. Thereafter, the item assembly module 130 can combine current code sections and data for the analysis module, insert them into the selected item, and allow the item to be delivered. The code sections can be retrieved from a code database 156. The code database 156 can store various types of code sections, including code sections for identifying events at a one of the devices (e.g., event listeners), code sections for routing data regarding such events, based on routing data, to an appropriate event handler, and the code sections for the event handlers. The event handlers can then generate messages regarding user engagement. In the present technology, the routing data is embodied in the form of an event dictionary, which can be stored and be retrieved from an event dictionary database 158.

The entries in the event dictionary can correspond to events such as a page view at the end user device, a trackable view type generated at the end user device, a gesture detected at the end user device, a media item event at the end user device, or a system-level event at the end user device.

The present technology contemplates that the contents of the analysis module being inserted into invitational content can vary over time. Accordingly, other components can be provided in content delivery system to facilitate such updates. The present technology contemplates that as developers generate new invitational content, such developers will also identify new types of events to monitor and will also generate new types of event handlers for processing data associated with such events into a useful message. Accordingly, the present disclosure contemplates providing a handler registration module 132 to facilitate this process. In particular, the developer can identify to the content delivery system 106 that a new event handler is being provided. For example, via developer user terminals $103_1$, $103_2$, . . . , $103_n$ (collectively "103"), the developers can access the handler registration module 132 by providing the event handler to be registered and an identification of the types of events associated with the event handler. Thereafter, the handler registration module can store the event handler in the code database 156.

Working in concert with the handler registration module 132 can be a dictionary updater module 130. As discussed above, an event dictionary is utilized by an analysis module to route event data to an appropriate event handler. Therefore, the present disclosure contemplates that when an event handler is registered with the handler registration module, contemporaneously a dictionary updater module 134 can utilize information provided during the registration process to create an entry in the event dictionary. For example, the dictionary updater module 134 can update the event dictionary stored in event dictionary database 158.

The present disclosure also contemplates that the content delivery system 106 can receive messages from user terminals 102 regarding user engagement with invitational content. In some embodiments, all messages from user terminals 102 can be routed to a single database, such as event log database 160. However, in other embodiments, the messages can be processed and routed to different locations. For example, content delivery system 106 can include a data routing module 136 that intelligently routes and/or stores messages based on their origin and/or contents. In some particular embodiments, the data routing module 136 can be configured to provide different routing of messages generated via the supplemental analysis module in the invitational content and messages generated via invitational content item, outside of the analysis module, i.e., its native capabilities. The data routing module 136 can cause routing of event messages to different databases, storage locations, or different portions thereof. In some cases, the data routing module 136 can encrypt or otherwise obfuscate the content of the event messages to ensure that certain types of messages are accessible to only certain persons.

Now that some basic concepts have been set forth, the present disclosure turns to a more detailed description of the present technology. As discussed above, the present technology is directed to systems and methods to improving the reporting capabilities of invitational content with respect to user engagement. An exemplary item of invitational content is shown with respect to FIGS. 2A and 2B.

Figure 2A:
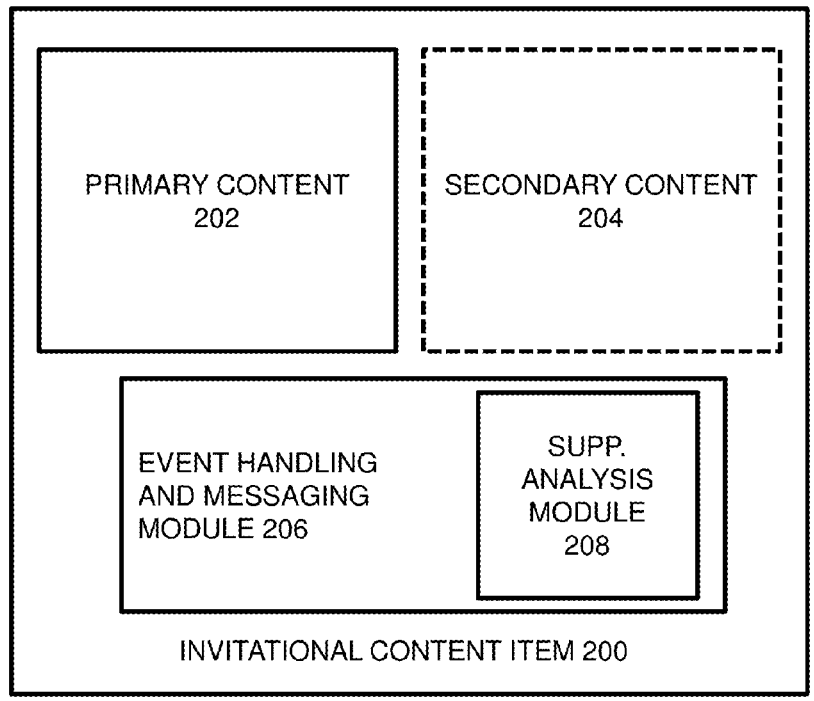
FIG. 2A illustrates an exemplary item of invitational content.

FIG. 2A illustrates an exemplary item 200 of invitational content configured in accordance with the present technology. As shown in FIG. 2A, the item 200 can include some primary content 202 and optionally some secondary content. For example, in the case of a mobile advertising unit, the primary content 202 can be content designed to fill a page and the secondary content 204 can be content designed to fill less than a page, such as a banner or other small notification. The item can also include an event handling and messaging module 206, which includes the event detection and message generation capabilities of the item 200 hard-coded by the developer. For example, in some configurations, this can be implemented by creating an event detection and reporting engine via JavaScript or other scripting languages.

In addition with the foregoing elements, the item 200 can also include the supplemental analysis module 208. This module is configured to operate independently of the other components of the item 200. Thus, it can be inserted, as described above, without significantly impacting the operation of the item itself. In some embodiments, the supplemental analysis module 208 can be completely autonomous. In other embodiments, the supplemental analysis module 208 can "piggyback" on the event handling and messaging module 206. For example, the supplemental analysis module 208 can be limited to code sections that will be executed by the engine already provided in the event handling and messaging module 206. Thus, these code sections are processed and executed along with any other code sections in the event handling and messaging module 206.

Figure 2B:
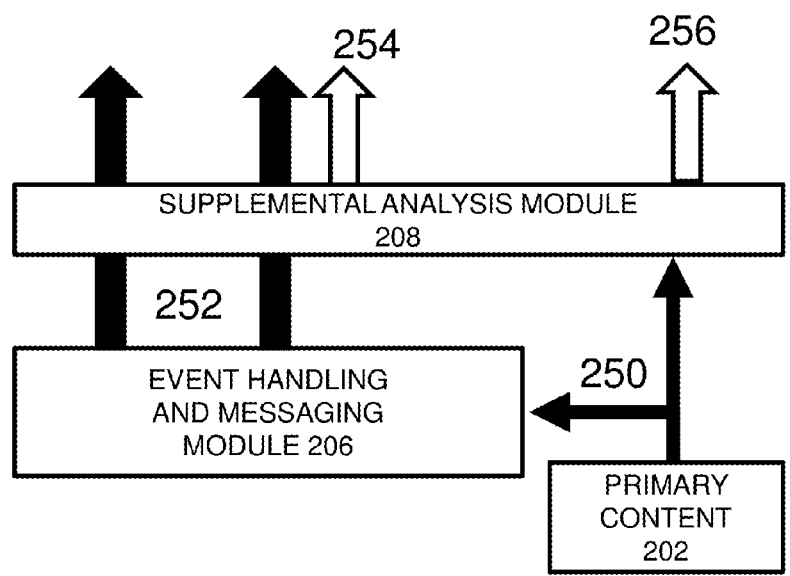
FIG. 2B illustrates an exemplary of the modules of the item of FIG. 2A.

The interaction between the components in item 200 can occur in a variety of ways, as illustrated in FIG. 2B. FIG. 2B illustrates an exemplary of the modules of the item of FIG. 2A. When the item 200 is operated, this operation causes the primary content 202 (or secondary content 204) to be presented. As the user interacts with the primary content 202, this results in signals 250 corresponding to the interactions being generated from the primary content. In a conventional item, such signals would be routed to the event handling and messaging module 206, which would listen for particular signals or combinations thereof and generate messages 256 according to the hard-coded instructions in module 206.

In the item 200, the supplemental analysis module 208 is utilized to modify the event messages generated. This can be accomplished in one of two ways. In a first method, the messages generated by the event handling and messaging module 206 can be intercepted, processed, and additional messages 254 can be generated. In particular cases, the supplemental analysis module 208 can also be configured to block messages 252 if a message 254 is generated or based on other criteria. In a second method, the signals 250 associated with the primary content 202 can be directly received by the supplemental analysis module 208, processed, and additional messages 256 can be generated. The messages 252, 254, and 256 can then be delivered to a content delivery system or other receiving device.

Figure 3:
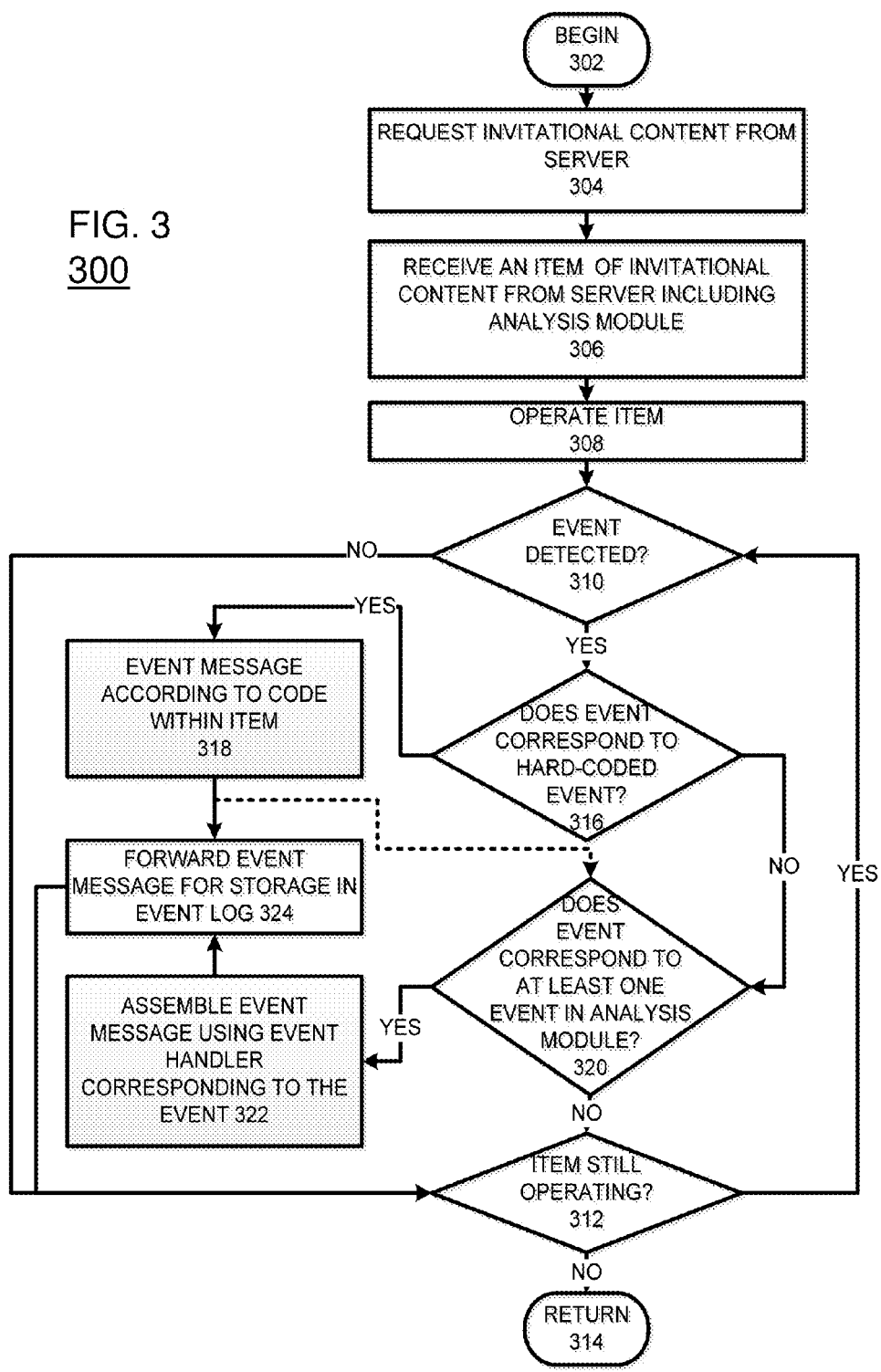
FIG. 3 illustrates an exemplary method embodiment.

Now turning to FIG. 3, an operation of the supplemental analysis module will be discussed in greater detail. FIG. 3 is a flowchart of step in an exemplary method 300 for processing invitational content at a user terminal. Method 300 begins at step 302 and continues to step 304. At step 304, a user terminal requests one or more items of invitational content. In response to the request at step 304, an item is received at step 306. As noted above, the item that is received includes not only the components of a conventional item of invitational content, but has been supplemented by the inclusion of an analysis module. The analysis module includes, as described above, an event dictionary, code sections for identifying events, code sections for routing events to event handlers according to the event dictionary, and the event handlers themselves, where the event handlers include code sections for assembling messages.

With respect to the event handlers, the present disclosure contemplates that these event handlers can be configured in a variety of ways. In some embodiments, the event handlers can require that all information required for a message be routed to them. However, in other embodiments, the event handlers can be configured to receive partial information and obtain the remaining information autonomously. Further, the event handlers can be configured to provide messages with a variety of content in a variety of formats. In particular embodiments, the messages generated by the event handlers can be required to provide particular data fields to ensure consistency among all messages forwarded by the event handlers. This also facilitates subsequent processing and analysis of such messages.

In one particular embodiment, a message can indicate an event name, an event section, an event sender, event arguments, and event type. It should be noted that although the terms "event name", "event section", "event sender", "event arguments", and "event type" are explicitly identified above and utilized through the discussion below, these terms are provided solely for identification purposes of the different portion of the message and not for descriptive purposes.

The event section can be utilized to define the parent object associated with the particular object generating the event. Alternatively, this can be referred to as a page name. That is, a full screen named region where the event or activity has occurred.

The event type can be a general category of event, including but not limited to: page events, view events, debug events, gesture events, and media events. Page events can be, for example, events associated with a user visiting different pages in an item. View events can be, for example, events associated with the presentation of a particular object. Debug events can be, for example, events associated with errors or other problems during operation of the item. Gesture events can be, for example, gestures made in the user interface by the end user, regardless of whether or not it resulted in another event. Finally, media events can be, for example, any events associated with aspects of a presentation of a media item, including but not limited to: starting, stopping, pausing, or skipping of playback. These types of events are provided solely as examples. The present technology contemplates that other types of events can be defined.

The event name or component name can be the particular subtype of event. For example, in the case of page events, these can include presentation of a media item (full-screen) or wallpaper or background. In the case of view events, the subtypes can include carousel or scroll views and video player views. In the case of debug events, the subtypes can include different types of error messages or artifacts. In the case of gesture events, the subtypes can include taps, swipes, shake, or pinching. In the various embodiments, these event or component names are typically a pre-defined list or set of names. The subtypes listed above are provided by way of example only. One or more other subtypes (and thus event name) can also be defined for any event type.

In the present technology, the event types and event names are standardized to facilitate subsequent processing and analysis.

The event sender can be utilized to uniquely identify the particular object or objects directly associated with the event. For example, in the case of a single tap or double tap, the event sender can be the unique identifier for the object associated with the generation of the single tap or double tap. In another example, the event sender value can be based on the name of the asset or object associated with the event.

In one particular example, the case of an event associated with HTML or XML elements associated with a Document Object Model (DOM), the unique identifier for the event sender can be selected as follows. First, an attempt is made to obtain the unique identifier based on the element for a backing layer of view object associated with the event. In one configuration, a specific data attribute within the element can be selected to provide the unique identifier. For example, in the value of a data-attribute name A can be selected to provide the unique identifier. In another configuration, there can be multiple data attributes that can provide the unique identifier. In some cases, any one of these data attributes can be used to provide the unique identifier. For example, if data attributes A, B, and C are provided, any one of these can be selected to provide the unique identifier. In other cases, the various data attributes can be selected in a particular or preferred order, so that the most preferred data attribute is selected. For example, if data attributes A, B, and C are provided and define an order of preference for a unique identifier, A can be searched for first, then B can be searched for only if A is absent, and C can be searched when A and B are absent.

If a suitable unique identifier cannot be matched or found within the element, the nearest parent element in a tree defined by the DOM and that has a qualified backing view object is selected. Thereafter, a search is performed in the child element that is the same search performed in this parent element. If a suitable data attribute is found in the parent element, it is then used as the unique identifier for the child element. If a suitable data attribute is not found in this parent element, the process is repeated by continuing up the tree, testing all qualified elements and returning the appropriate value, until a suitable data attribute is found or the root element in the DOM is reached. A root element in a DOM is, by convention, the backing layer of a view object with a unique identifier. Accordingly, in the worst case, the unique identifier for the root element is used.

It should be noted that for some types of objects, such as JavaScript objects, a DOM representation may not exist. However, typically such objects will be configured to include data attributes which include a suitable unique identifier. For example, in the case of a JavaScript object, it typically requires inclusion of a unique object identifier.

The present disclosure also contemplates utilizing a hierarchical name. That is, unique object identifiers can be selected from multiple levels of the DOM. For example, if an element has multiple parent elements, the unique object identifiers from the various parent elements can be combined to generate a unique identifier value for the child element.

The event arguments can be utilized to identify particular information or items to be used by objects. For example in the case of media items, the event argument can identify the particular media file to be used. In another example, as in the case of gesture events, the arguments can specify time, position, and location associated with the gesture event. It should be noted that in some cases, the event argument need not be populated. For example, gesture events and media events can include arguments, but they can be excluded for other event types. In some configurations, these can be expressed as a set of key-value pairs.

Referring back to FIG. 3, once the item is received at step 306, the method can proceed to step 308. At step 308, operation of the item is begun. This can include presenting, displaying, or otherwise activating the item of invitational content. Thereafter, at step 310, it is determined whether or not an event was detected in the item. In other words, did some action occur at the item, responsive to user input or not.

If no event is detected at step 310, the method 300 proceeds to step 312. At step 312, if the item is no longer in operation, the method 300 continues to step 314 to resume previous processing. Otherwise, the method 300 returns to step 310.

If an event is detected at step 310, the method proceeds to step 316. At step 316, if the event corresponds to a hard-coded event within the item, the method proceeds to step 318 and an event message is generated according to the code set forth by the developer in the item. If the event does not correspond to a hard-coded event, the method proceeds to step 320. However, in some cases, event when the item generates a message at step 318, the method can still proceed to step 320.

At step 320, it is determined whether the event corresponds to an event in the analysis module. In particular, the events detected are compared with the entries in the event dictionary to determine whether an appropriate event handler has been provided for the events. If there is no correspondence, the method proceeds to step 312. If there is a correspondence, the method then proceeds to step 322. At step 322, the information associated with the event is routed to the event handler identified in the event dictionary. The event handler can generate a message for the event according to the code set forth for the event handler in the analysis module. It should be noted that the present disclosure contemplates that if an event does not correspond to an entry in the event dictionary, no message would be created.

In response to the generating of event messages at steps 318 and 322, the method 300 can proceed to step 324. At step 324, the event messages can be forwarded to an event log for storage. The method 300 can then proceed to step 312, as previously discussed.

From the foregoing, the advantages of the present technology become apparent. For example, the inclusion of the analysis module can be used to "retrofit" items in order to collect data previously unavailable from just the hard-coded sections. Thus, this allows a developer to start collecting new types of data without needing to update the item. Further, as the same module can be applied to multiple items, this also allows the developer to collect data across all items in a consistent manner without having to update each and every item. Another advantage is that this provides a mechanism for the entity managing with the content delivery system to collect additional data regarding the effectiveness of invitational content items and advise developers accordingly. Further, such data collection also can provide new data that might be useful for updating campaigns to make sure that targets are being met without requiring developers to add additional code to their items.

Figure 4:
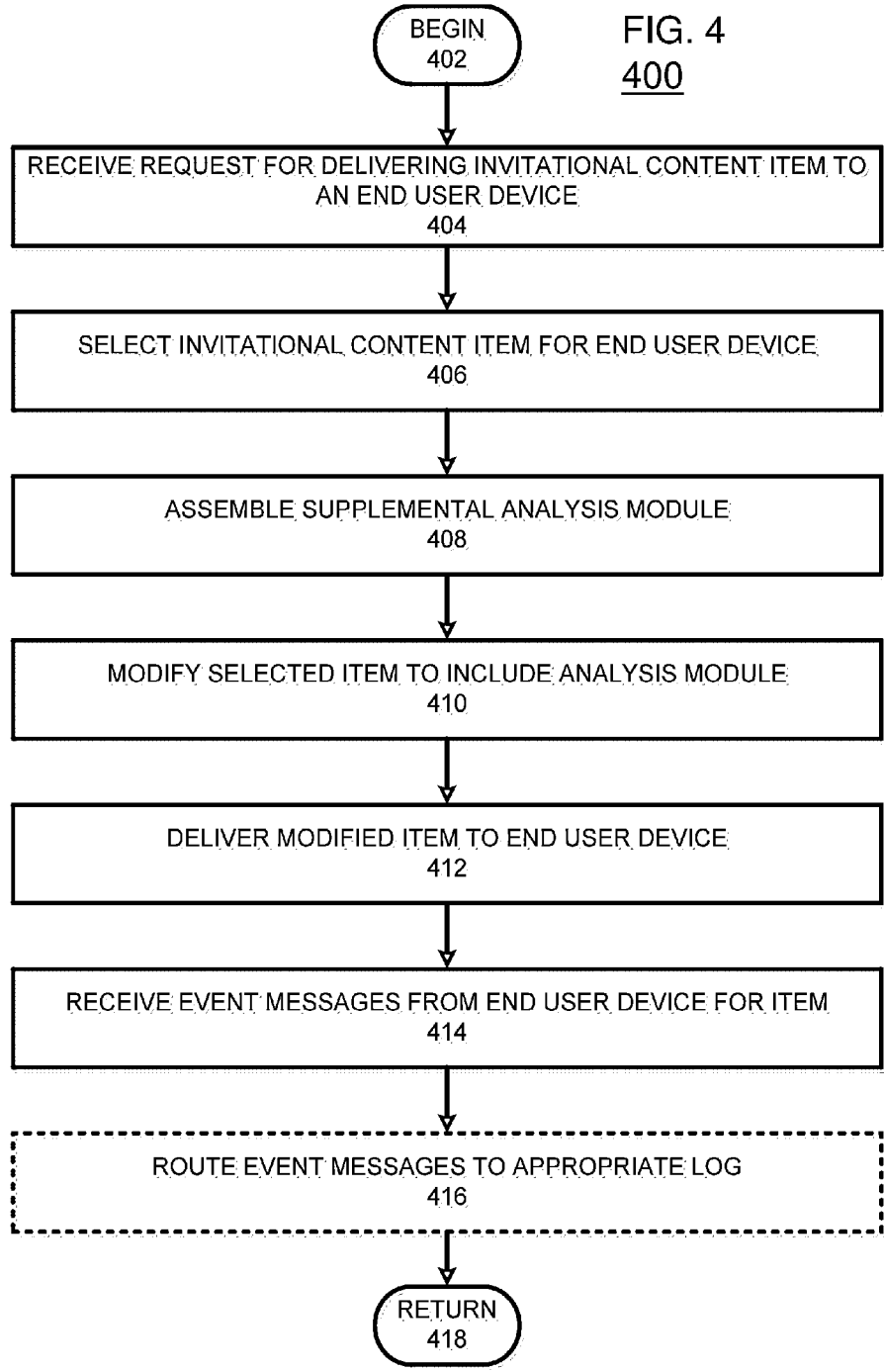
FIG. 4 illustrates an exemplary method embodiment.

Another aspect of the present disclosure is the generating of the invitational content items for the user terminals at a content delivery system. This process is illustrated with respect to FIG. 4. FIG. 4 is a flowchart of steps in an exemplary method 400 for delivering invitational content in accordance with the present technology.

Method 400 begins at step 402 and continues on to step 404. At step 404, the content delivery system receives a request for delivering invitational content to a user terminal. Thereafter, at step 406, the content delivery system can select one or more items of invitational content for the user terminal. Prior to delivery of the items, the method 400 can proceed to assembling and adding a supplemental analysis module to the items, starting at step 408.

First, at step 408, the supplemental analysis module is assembled. As described above, this step involves combining an analysis engine or code along with an event dictionary and event handlers corresponding to the entries in the event dictionary. The analysis engine or code can include code sections for detecting events, comparing them to entries in the dictionary, and thereafter routing the event data to the appropriate event handler to generate a message, if a corresponding entry exists.

Once the analysis module is assembled at step 408, the item of invitational content can be modified at step 410 to include the analysis module. This can be performed in a variety of ways. For example, in the case of a JavaScript-based item, the additions can be embodied as additional JavaScript code sections for the item.

A content delivery system, such as that in FIG. 1, can be configured for insertion or injection of such analysis modules as follows:

a. The analysis module and related handlers can added to an existing local folder structure and injected into the invitational content via an src attribute of the HTML script tag or other attributes specifying a URL of an external script file.
  b. A server or store can be provided in content delivery system 106, or elsewhere in system 100, to host the analysis module and related handlers. Thereafter, the modules can be requested from such a server or store as needed for insertion into the invitational content.
  c. In addition to the storing and requesting of the main analysis modules, analytic event handlers can be stored and downloaded on demand from a server or store in system 100. For example, if a registered event is detected by the analysis module, but the event's registered analytic event handler cannot be found in the local file system, the analysis module can be configured to ask a known content distribution network system or network to provide the appropriate handler via XMLHTTP request. Once loaded, this handler can then be used for the current and all future analytic events it was originally registered for.

After the item is modified at step 410, the modified item can be delivered to the user terminal at step 412. Thereafter, the content delivery system can receive event messages at step 414. Optionally, at step 416, the messages can be routed to an appropriate log. For example, as previously discussed, the messages can be routed to different logs based on type, source, or any other criteria based on the contents of the messages. Finally at step 418, the method 400 can resume previous processing, including repeating method 400.

As noted above, the present disclosure contemplates providing a single analysis module. This provides the advantage of a collective development of the analysis module. That is, since multiple developers can register event handlers, all developers benefit from the discovery by one developer of a particular data type. However, the present disclosure also contemplates that different analysis module can be generated at different times. For example, for certain items of invitational content, different analysis modules can be assembled. Similarly, the assembly of the analysis module can be based on any of the user characteristics, developer characteristics, temporal characteristics, etc. Such different analysis modules can include different event dictionaries and thus different sets of event handlers.

Figure 5:
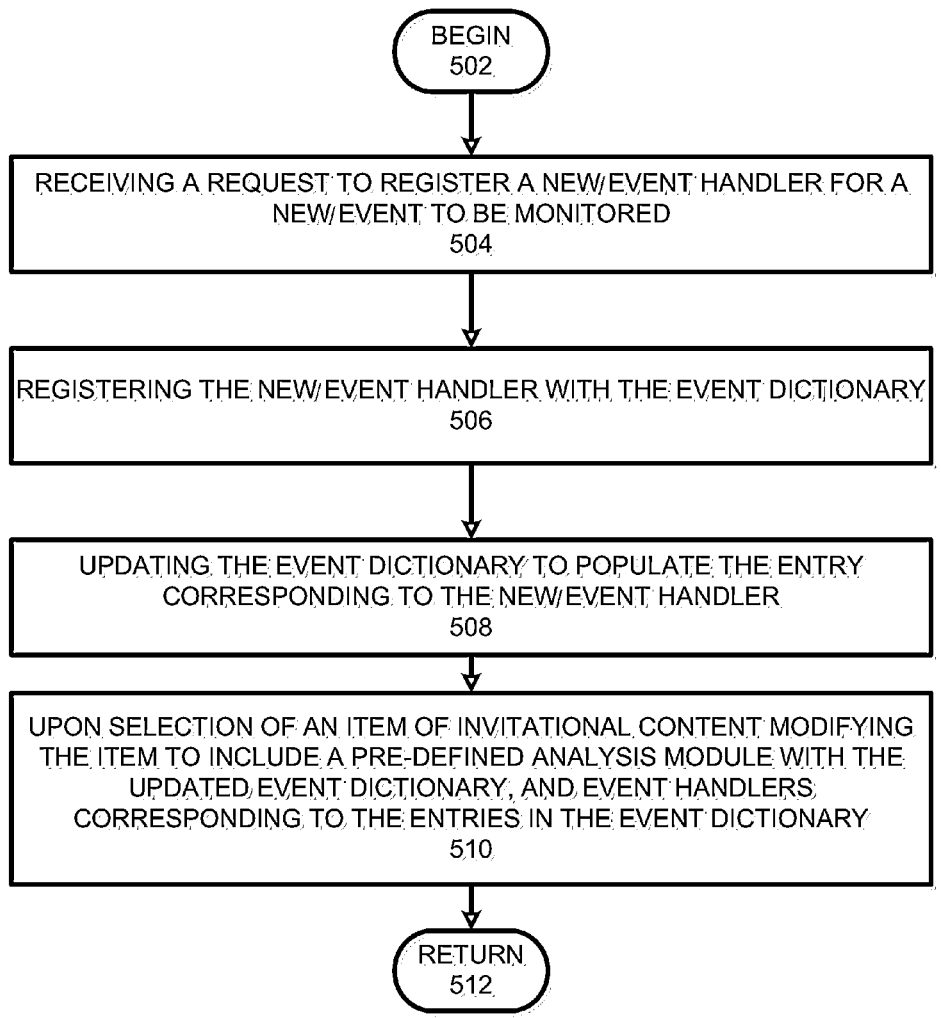
FIG. 5 illustrates an exemplary method embodiment.

Another aspect of the present technology is the manner of updating the event dictionary and the event handlers. This is illustrated with respect to FIG. 5. FIG. 5 shows a flowchart of steps in an exemplary method 500 for updating items for the analysis module in accordance with the present technology. This can be performed, for example, at the content delivery system.

Method 500 begins at step 502 and proceeds to step 504. At step 504, a request is received for registering a new event handler to be included in the analysis module. The request can specify the code or location of the code for the new event handler. The request can also specify instructions for determining when event data is to be forwarded to the new event handler. It should be noted that although the generation of a new request may be the result of a developer generating a new item of invitational content, knowledge of the new item is not required for the request. Rather, in the various embodiments, the items of invitational content with which the analysis module is to be paired with are presumed to conform to some standard architecture so that the form of the event handlers is standardized for all developers. This also ensures that when the analysis module is subsequently assembled, the new event handler will be operational without issue.

Once the request is received at step 504, the event handler is registered with the event dictionary. That is, an entry is created corresponding to the event handler and the new event handler is added to the event handler database. Thereafter, at step 506, the event dictionary is updated at step 508 to populate the entry for the event dictionary corresponding to the event handler. The populating at step 508 can be performed in a variety of ways. In some embodiments, this populating can involve processing data provided in the request to add extra event information. In other embodiments, the populating can involve analyzing the event handler to determine the type of events and associated data it is designed to process. Alternatively, a combination of both can occur. In the event that multiple event dictionaries are being used, the event handlers can be registered according to the request, pre-defined rules at the content delivery system, or some combination of both. This registration process can be performed in a variety of ways. In one particular configuration, the analysis module can have a static class method that takes two arguments: an analyticsEventHandler Object and an HTML event String. Once the appropriate asserts have been done to verify the validity and types of the arguments, the handler is added to a private dictionary object keyed by the event. After an object that dispatches events has been defined, its events can be added to the dictionary by calling the static class method and passing the two parameters.

Once the request is processed according to steps 504-508, the method can proceed to step 510. At step 510, the new event handler and the updated event dictionary can be published. Thus, upon receipt of a request for an item of invitational content, the item can be modified to include an analysis module with the updated event dictionary and the new event handler. The method 500 can then proceed to step 512 and resume previous processing, including repeating method 500.

It is contemplated that a request to remove an event handler can be provided in a similar way. That is, the request can specify the event handler to be removed and thereafter the event handler is removed from the event handler database and the corresponding entry is removed from the event dictionary. Some user permissions can be put in place to permit only the submitter or an administrator to remove the event handler. Further, if the content delivery system is aware of other users actively using the event handler, deletions can be restricted. In such configurations, a use registration process can be provided to record users actively relying on certain event handlers for data.

As noted above, the present disclosure contemplates a single or multiple analysis modules being generated. Accordingly, the registration of an event handler can also be specific to particular analysis modules. Thus, the request can specify which analysis modules the event handler is to be associated with and the event dictionaries for these can be updated accordingly. Alternatively, the hander registration module of the content delivery system can include rules for determining which analysis modules a particular event handler is to be associated with. These can be based on, for example, any characteristics set forth in the request, features of the event handler, or the types of events the event handler is associated with, to name a few.

The present disclosure contemplates that the event dictionary can have fixed and variable portions. In particular, the variable portions can correspond to the developer-supplied event handlers. The fixed portions can be pre-defined or default events, such as system level events or events that are most common across all types of items of invitational content. In such cases, different user permissions can be required in order to add or remove fixed items.

Figure 6A:
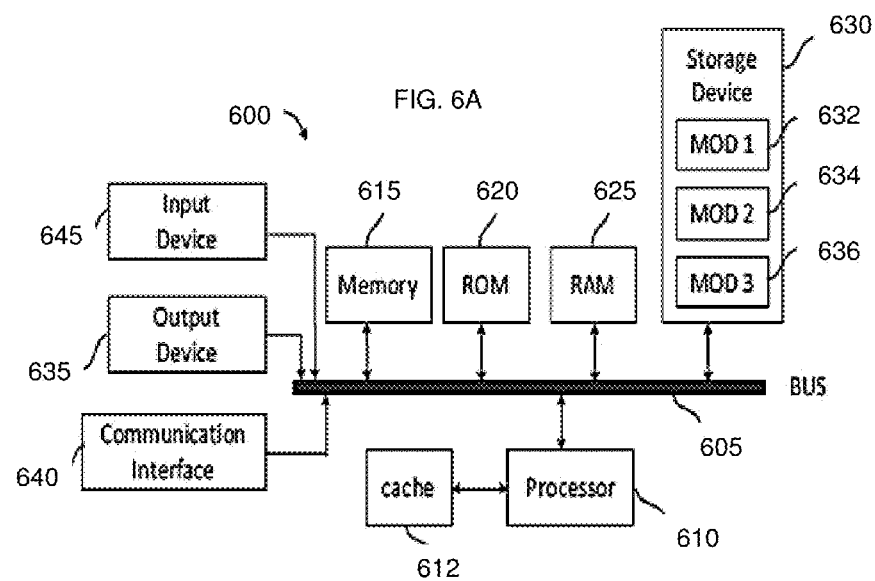
FIG. 6A and FIG. 6B illustrate exemplary system embodiments.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

Figure 6B:
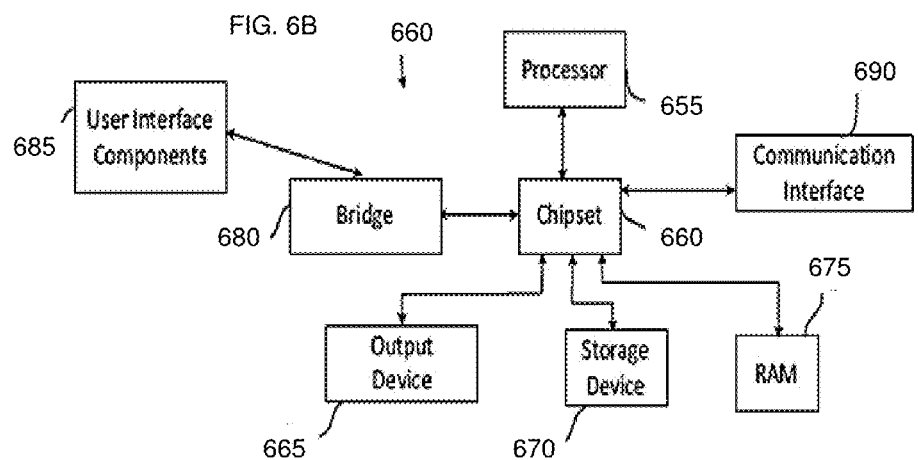

FIG. 6B illustrates a computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that exemplary systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Claim language reciting "at least one of" a set indicates that one member of the set or multiple members of the set satisfy the claim. Tangible computer-readable storage media, computer-readable storage devices, or computer-readable memory devices, expressly exclude media such as transitory waves, energy, carrier signals, electromagnetic waves, and signals per se.

We claim:

1. A computer-implemented method comprising:
    identifying an initial item of invitational content for delivery to an end user device, the initial item of invitational content configured to track a first subset of events specified by a content provider;
    inserting an analysis module into the initial item of invitational content to yield a modified item of invitational content, the analysis module comprising an analysis engine, an event dictionary, and at least one event handler associated with a type of event; and
    delivering the modified item of invitational content to the end user device, wherein the analysis engine is configured to cause the end user device to, collect event information generated at the end user device, determine whether the event information corresponds to at least one entry in the event dictionary, and route the event information to the at least one event handler corresponding to the at least one entry,
wherein the at least one event handler is configured to assemble, an event message for the event log for the type of event associated with the at least one event handler.

2. The method of claim 1, wherein each entry of the event dictionary corresponds to one of a page view at the end user device, a trackable view type generated at the end user device, a gesture detected at the end user device, a media item event at the end user device, or a system-level event at the end user device.

3. The method of claim 1, wherein each of the at least one event handler inserts a plurality of parameters in the event message.

4. The method of claim 3, wherein the plurality of parameters comprise an event section for a region associated with the event, an event name identifying a subtype of the event, an event sender identifying an object associated with the event, and an event type identifying a type of event.

5. The method of claim 3, further comprising:
registering a new event handler with the event dictionary;
updating the event dictionary with entry information corresponding to the new event handler to update the event dictionary to yield an updated event dictionary; and
repeating the identifying, assembling, incorporating, and delivering using the updated event dictionary.

6. The method of claim 1, further comprising:
receiving the event message associated with the modified item of invitational content from the end user device;
determining whether event data corresponds to the analysis module associated with the modified item;
upon determining that the received event data corresponds to the analysis module associated with the modified item, forwarding the received event message to a first log; and
upon determining that the received event data fails to correspond to the analysis module associated with the modified item, forwarding the received event message to a second log separate from the first log.

7. The method of claim 1, wherein the analysis engine is configured to collect the event information by intercepting and processing an event message generated outside of the analysis module.

8. A computer-implemented method comprising:
obtaining an item of invitational content from a server comprising an analysis module and a first subset of events specified by a content provider, the analysis module comprising an analysis engine, an event dictionary, and at least one event handler associated with a type of event, the at least one event handler configured for assembling at least one event message for an event log that tracks a second subset of events in addition to the first subset of events, wherein the second subset of events are different from the first subset of events, and the analysis engine configured for causing the end user device, responsive to operation of the item at an end user device, to collect event information generated at the end user device, determine whether the event information corresponds to at least one entry in the event dictionary, and route the event information to the at least one event handler corresponding to a type of event to which the event handler is associated and that is included in the second subset of events;
operating the item at an end user device;
detecting the assembling of the at least one event message for an event log that tracks the first subset of events and the second subset of events; and
forwarding the event message to the server.

9. The method of claim 8, wherein the item is configured to generate, outside the analysis module, at least one external event message, and wherein the analysis module is further configured for intercepting the external event message and generating an additional event message according to a corresponding entry in the event dictionary.

10. The method of claim 8, wherein each entry of the event dictionary corresponds to one of a page view at the end user device, a trackable view type generated at the end user device, a gesture detected at the end user device, a media item event at the end user device, or a system-level event at the end user device.

11. The method of claim 8, wherein each of the at least one event handler inserts a plurality of parameters in the event message.

12. The method of claim 11, wherein the plurality of parameters comprise an event section for a region associated with the event, an event name identifying a subtype of the event, an event sender identifying an object associated with the event, and an event type identifying a type of event.

13. A content management system, comprising:
a communications interface;
a processor; and
a computer-readable medium, having stored thereon a plurality of instructions for causing the processor to:
identify an initial item of invitational content for delivery to an end user device, the initial item of invitational content configured to track a first subset of events specified by a content provider;
insert an analysis module into the initial item of invitational content to yield a modified item of invitational content, the analysis module comprising an analysis engine, an event dictionary, and at least one event handler associated with a type of event; and
deliver the modified item of invitational content to the end user device, wherein the analysis engine is configured to cause the end user device to, collect event information generated at the end user device, determine whether the event information corresponds to at least one entry in the event dictionary, and route the event information to the at least one event handler corresponding to the at least one entry, wherein the at least one event handler is configured to assemble, an event message for the event log for the type of event associated with the at least one event handler.

14. The system of claim 13, wherein each entry of the event dictionary corresponds to one of a page view at the end user device, a trackable view type generated at the end user device, a gesture detected at the end user device, a media item event at the end user device, or a system-level event at the end user device.

15. The system of claim 13, wherein the plurality of parameters comprise an event section for a region associated with the event, an event name identifying a subtype of the event, an event sender identifying an object associated with the event, and an event type identifying a type of event.

16. The system of claim 15, the computer-readable medium further comprising instructions for causing the processor to perform operations comprising:
obtaining a new event handler;
registering the new event handler with the event dictionary;

updating the event dictionary with entry information corresponding to the new event handler to yield an updated event dictionary; and repeating the identifying, assembling, incorporating, and delivering using the updated event dictionary.

17. The system of claim 13, further comprising instructions for the processor to perform the operations comprising:

receiving, via the communications interface, an event message associated with the modified item from the end user device;

determining whether the received event data corresponds to the analysis module associated with the modified item;

upon determining that the received event data corresponds to the analysis module associated with the modified item, adding the received event message to a first log; and upon determining that the received event data fails to correspond to the analysis module associated with the modified item, adding the received event message to a second log separate from the first log.

18. The system of claim 13, wherein the analysis engine is configured to collect the event information by intercepting and processing an event message generated outside of the analysis module.

19. A communications device, comprising:
a communications interface;
a processor; and
a computer-readable medium having stored thereon a plurality of instructions for causing the processor to perform operations comprising:
receiving an item of invitational content configured to track a first subset of events specified by a content provider, the item of invitational content comprising an analysis module, the analysis module comprising an analysis engine, an event dictionary, and at least one event handler associated with a type of event assembling, by the at least one event handler, at least one event message based on tracking a second subset of events in addition to the first subset of events at the communications device, wherein the second subset of events are different from the first subset of events;

operating the item;

detecting the assembling of the at least one event message; and transmitting the event message via the communications interface, wherein the analysis engine is configured for causing the processor, responsive to the operating of the item, to collect event information generated at the communications device, determine whether the event information corresponds to a type of event in the event dictionary, and route the event information to the at least one event handler corresponding to the type of event.

20. The device of claim 19, wherein the item is configured to generate, outside the analysis module, at least one external event message, and wherein the analysis module is further configured for intercepting the external event message and generating an additional event message according to a corresponding entry in the event dictionary.

21. The device of claim 19, wherein each entry of the event dictionary corresponds to one of a page view at the communications device, a trackable view type generated at the end user device, a gesture detected at the communications device, a media item event at the communications device, or a system-level event at the communications device.

22. The device of claim 19, wherein each of the at least one event handler inserts a plurality of parameters in the event message, the plurality of parameters comprising an event section for a region associated with the event, an event name identifying a subtype of the event, an event sender identifying an object associated with the event, and an event type identifying the type of event.

* * * * *